Patented Dec. 11, 1951

2,577,844

UNITED STATES PATENT OFFICE 2,577,844

PRODUCTION OF CARBOXYETHYL CELLULOSES

Mamerto Manahan Cruz, Jr., Wilmington, Del., assignor to American Viscose Corporation, Wilmington, Del., a corporation of Delaware No Drawing. Application November 28, 1947, Serial No. 788,679

3 Claims. (Cl. 260—231)

This invention relates to the production of cellulose ethers and, in particular, to the production of cellulose ethers containing the carboxyethyl group and soluble in water or dilute aqueous alkaline solutions.

Previously, it has been proposed to produce carboxyethyl ethers of cellulose by reacting acrylonitrile with cellulose in particle or fiber form, in suspension in water containing a strongly basic hydroxide. The disadvantage of that method is that the ethers obtained are not homogeneous. The cellulose particles or fibers suspended in the aqueous slurry consist of bundles of molecular chains. Only those chains at the surface of the particles or fibers are available for reaction with the acrylonitrile. The primary purpose in modifying the cellulose by substitution of carboxyethyl groups for the hydroxyl groups is to increase the reactivity of the cellulose, for example, the reactivity thereof to cross linking agents of the formaldehyde type. Since when cellulose in particle or fiber form is reacted with acrylonitrile all of the molecular chains of the cellulose are not available for reaction with the etherifying agent, and the reaction takes place only at the surface of the particles or fibers, the final ethers, which are heterogeneous, do not exhibit greatly increased reactivity as compared to unmodified cellulose itself.

Carboxyethyl ethers can be obtained by reaction between viscose and acrylonitrile, and the ethers finally obtained are homogeneous and exhibit greatly increased reactivity. There, the cellulose is in the dissolved state in which all of the molecular chains are available for reaction with the acrylonitrile. However, that method of producing carboxyethyl celluloses has the drawback that the viscose comprises sulfur-containing by-products arising from hydrolysis of the xanthate, such by-products including sodium trithiocarbonate, sodium sulfide, and sodium hydrosulfide. When acrylonitrile is added to viscose as such, it apparently reacts first with the sulfur-containing by-products to produce carbon disulfide, and the reaction between the cellulose and acrylonitrile to produce carboxyethyl ethers takes place only as a secondary phenomenon. It is difficult under these conditions, to produce highly substituted cellulose ethers which are soluble in water or dilute aqueous alkaline solution, even when the proportion of acrylonitrile present is high.

All of the foregoing disadvantages are avoided by the method of the present invention, in accordance with which viscose of any salt point, and preferably a viscose of salt point around 5 to 6, as determined by the standard sodium chloride test, is coagulated in a liquid which is a coagulating medium for viscose and a solvent for the sulfur-containing by-products present in the viscose, but which is not a regenerating medium for cellulose, the coagulated viscose (sodium cellulosate and sodium cellulose xanthate) gel is then dissolved in water containing a strong base, for example, sodium hydroxide, whereby a solution containing cellulose in the dissolved state is obtained, and the dissolved cellulose is reacted with acrylonitrile, which is preferably added to the solution dropwise, with stirring. After the reaction is complete and the reaction product consists substantially entirely of carboxyethyl cellulose, usually after the reaction mass has stood for about 20 to 24 hours at temperatures between 5° C. and 40° C., and preferably at room temperature, the ether is precipitated by pouring the solution into liquid which is a solvent for acrylonitrile and a non-solvent for the ethers.

As coagulating medium for the viscose there may be used such substances as acetic acid, a salt of a strong acid and a weak base such as ammonium sulfate, sodium bisulfate, and mixtures of acetic acid and sodium bisulfate or the like. The substances mentioned all coagulate the viscose and dissolve the sulfur-containing by-products contained therein without regenerating the cellulose. After washing of the coagulated viscose to remove any residual by-products adhering thereto, the resulting gel consists essentially of sodium cellulosate and sodium cellulose xanthate. When the gel is dissolved in sodium hydroxide solution, and acrylonitrile is added, the xanthate groups break away and are replaced by carboxyethyl groups. In the absence of sulfur-containing by-products, the acrylonitrile reacts directly with the cellulose, substitution of carboxyethyl groups for the xanthate groups apparently taking place directly as soon as the xanthate groups are removed by hydrolysis. It is possible, by the method of the present invention, to produce a more highly carboxyethylated cellulose using relatively smaller proportions of acrylonitrile than is produced when the viscose is not coagulated prior to contacting it with the acrylonitrile in the presence of sodium hydroxide or the like.

The ratio of carboxyethyl groups to anhydroglucose units of the cellulose, and hence the solubility characteristics of the ethers, depends upon the conditions of the reaction, that is, the concentration of the strong base, and the amount of acrylonitrile added to the solution. It is within the scope of this invention to adjust the concentration of the strong base, and the total amount of acrylonitrile added to the solution, to obtain carboxyethyl cellulose ethers wherein the ratio of carboxyethyl groups to anhydroglucose units is within any desired range, depending upon the solubility characteristics desired for the final product, the essential feature of the invention residing in that the reaction is effected between acrylonitrile and cellulose in the dissolved state and substantially free of sulfur-comprising by-products, so that the ethers obtained are homogeneous regardless of their specific compositions and solubilities. A specific application of the improved method of the invention is in the production of ethers which are soluble in very dilute aqueous alkali solutions or in water. Such ethers contain between one carboxyethyl group per 2.3 or more anhydroglucose units and one carboxyethyl group per about 1.33 or less anhydroglucose units. The less highly substituted ethers, that is ethers in which the ratio of carboxyethyl groups to anhydroglucose units is 1:2.3 or more, and which are soluble in very dilute aqueous alkali solutions, such as aqueous solution of potassium hydroxide of 0.3% concentration, are obtained when the coagulated viscose is dissolved in a 6% aqueous solution of sodium hydroxide or equivalent base, and acrylonitrile is added to the solution in an amount of about 10% based on the weight of the viscose.

The more highly substituted ethers, in which the ratio of carboxyethyl groups to anhydroglucose units is 1.33 or less and which are soluble in water at ordinary temperatures, can be obtained by increasing the amount of sodium hydroxide and acrylonitrile. To produce the more highly substituted ethers, the sodium hydroxide or the like is used in a concentration of about 10%, and the acrylonitrile is used in an amount of about 16 to 20%, based on viscose weight. A convenient method for producing the more highly substituted water-soluble ethers comprises allowing the solution obtained by dissolving the coagulated viscose in 10% sodium hydroxide solution and adding 10% of acrylonitrile, to stand at temperatures of from about 5° C. to 40° C. until the product of reaction between the dissolved cellulose and acrylonitrile consists substantially entirely of carboxyethyl cellulose, i. e., until substantially all of the cyanoethyl groups formed initially are hydrolyzed, adding additional acrylonitrile in an amount of from 6 to 10% to the reaction mass, and then holding the entire mass at a temperature of 5 to 40° C. until the reaction product again consists substantially entirely of carboxyethyl cellulose, that is, until substantially all of the cyanoethyl groups formed in the second stage of the process have been hydrolyzed, usually 20 to 24 hours at room temperature.

The degree of substitution, that is, the ratio of carboxyethyl groups to anhydroglucose units in the final product is also influenced by the age of the alkali cellulose from which the viscose is prepared. A viscose prepared from an alkali cellulose which has been aged for a longer time than is normal, for example, an alkali cellulose aged for about 90 hours or so, usually yields, upon reaction with acrylonitrile as described, a more highly substituted product than is obtained when the viscose is prepared from an alkali cellulose of normal age.

Carboxyethyl ethers prepared in accordance with this invention are homogeneous, of uniform composition throughout, and highly reactive.

The following examples in which the parts are by weight will serve to illustrate the invention.

Example 1

Viscose having a salt point of 5.4 was spun into a coagulating bath consisting of ammonium sulfate, at room temperature. The coagulated viscose threads were washed to remove adhering impurities and were then dissolved in 4 parts of water containing 6% sodium hydroxide. 10% of acrylonitrile based on the weight of the viscose was added dropwise, with stirring. The solution was held at room temperature for about 20 hours to permit complete hydrolysis, and was then poured into methyl alcohol to precipitate the carboxyethyl cellulose. The precipitated flocculent carboxyethyl ether was recovered by filtration. It was found to contain 3.41% nitrogen, which corresponds to one carboxyethyl group per 2.3 glucose units of the cellulose. The ether was soluble in aqueous potassium hydroxide solution of about 0.3% concentration.

Example 2

Viscose of 5.5–6 salt point was spun into a coagulating bath consisting of ammonium sulfate, at room temperature. The coagulated viscose threads were washed to remove adhering impurities and were then dissolved in 4 parts of water containing 10% sodium hydroxide. 10% of acrylonitrile based on the weight of the viscose was added dropwise, with stirring. The solution was held at room temperature for about 20 hours. 10% of acrylonitrile was then added to the mixture, and the whole was allowed to stand for about 24 hours, after which it was poured into methyl alcohol to precipitate the carboxyethyl cellulose. The flocculent precipitate was recovered, and the ether was found to contain 5% nitrogen, corresponding to one carboxyethyl group per about 1.33 anhydroglucose units of the cellulose. The product was soluble in water.

Ethers prepared in accordance with the invention can be formed into artificial fibers, films, sheets, plastics, etc., or they may be used in lacquers, coating compositions, or the like.

Since modifications and variations may be made in this invention without departing from the spirit and scope thereof, it is understood that the invention is not limited to the specific embodiments illustrated herein except as defined in the appended claims.

I claim:

1. A method for producing homogeneous cellulose carboxyethyl ethers which comprises treating viscose containing sulfur-comprising by-products with a substance selected from the group consisting of acetic acid, ammonium sulfate, sodium bisulfate, and mixtures of acetic acid and sodium bisulfate, to thereby simultaneously coagulate the viscose and dissolve out the sulfur-comprising by-products, washing the coagulated viscose to remove any residual sulfur-comprising by-products adhering thereto, dissolving the coagulated viscose in an aqueous solution of a strong base, and reacting the cellulose in solution with acrylonitrile to produce the cellulose carboxyethyl ether.

2. A method for the production of homogeneous cellulose carboxyethyl ethers which comprises treating viscose containing sulfur-comprising by-products with a substance selected from the group consisting of acetic acid, ammonium sulfate, sodium bisulfate, and mixtures of acetic acid and sodium bisulfate to thereby simultaneously coagulate the viscose and dissolve out the sulfur-comprising by-products, washing the coagulated viscose to remove any residual sulfur-comprising by-products adhering thereto, dissolving the coagulated viscose in a 6% aqueous sodium hydroxide solution, adding about 10% of acrylonitrile, based on the weight of the viscose to the solution, and maintaining the mass at a temperature between 5 and 40° C. until the product of reaction between the dissolved cellulose and acrylonitrile consists substantially entirely of carboxyethyl cellulose.

3. A method for the production of homogeneous cellulose carboxyethyl ethers which comprises treating viscose containing sulfur-comprising by-products with a substance selected from the group consisting of acetic acid, ammonium sulfate, sodium bisulfate, and mixtures of acetic acid and sodium bisulfate to thereby simultaneously coagulate the viscose and dissolve out the sulfur-comprising by-products, washing the coagulated viscose to remove any residual sulfur-comprising by-products adhering thereto, dissolving the coagulated viscose in a 10% aqueous sodium hydroxide solution, adding about 10% of acrylonitrile based on the weight of viscose to the solution, maintaining the solution at a temperature between 5 and 40° C. until the product of reaction between the dissolved cellulose and acrylonitrile consists substantially entirely of carboxyethyl cellulose, adding from about 6 to about 10% of acrylonitrile, based on the weight of the viscose, to the reaction mass, and maintaining the mass at a temperature between 5 and 40° C. until the reaction product again consists substantially entirely of carboxyethyl cellulose.

MAMERTO MANAHAN CRUZ, JR.

REFERENCES CITED

The following references are of record in the file of this patent:

UNITED STATES PATENTS

| Number | Name | Date |
|---|---|---|
| 1,121,605 | Bernstein | Dec. 22, 1914 |
| 1,996,197 | Freund | Apr. 2, 1935 |
| 2,349,797 | Bock et al | May 30, 1944 |
| 2,375,847 | Houtz | May 15, 1945 |
| 2,482,011 | MacGregor | Sept. 13, 1949 |
| 2,492,428 | Hollihan et al | Dec. 27, 1949 |
| 2,499,501 | Hollihan et al | Mar. 7, 1950 |
| 2,511,060 | Hollihan et al | June 13, 1950 |

FOREIGN PATENTS

| Number | Country | Date |
|---|---|---|
| 12,854 | Great Britain | of 1912 |
| 562,584 | Great Britain | July 7, 1944 |